United States Patent [19]

Yokoyama et al.

[11] Patent Number: 5,038,753
[45] Date of Patent: Aug. 13, 1991

[54] LIQUID HEATING APPARATUS OF THE PULSE COMBUSTION TYPE

[75] Inventors: Nobuyoshi Yokoyama; Susumu Ejiri, both of Toyoake, Japan

[73] Assignee: Paloma Kogyo Kabushiki Kaisha, Nagoya, Japan

[21] Appl. No.: 477,526

[22] Filed: Feb. 9, 1990

[30] Foreign Application Priority Data

Feb. 9, 1989 [JP] Japan .................................. 1-14542

[51] Int. Cl.⁵ ............................................ A47J 27/00
[52] U.S. Cl. .................................... 126/391; 126/390; 126/350 R; 126/360 R; 431/1; 99/403
[58] Field of Search ........... 126/391, 392, 390, 350 R, 126/360 R, 378, 343.5; 99/403; 431/1

[56] References Cited

U.S. PATENT DOCUMENTS

| | | | |
|---|---|---|---|
| 2,617,407 | 11/1952 | Johnson | 126/391 X |
| 4,550,711 | 11/1985 | Griffiths | 126/391 |
| 4,570,610 | 2/1986 | Himmel | 126/39 H X |
| 4,751,915 | 6/1988 | Price | 126/391 |

FOREIGN PATENT DOCUMENTS 62-125808 10/1987 Japan .

Primary Examiner—Larry Jones
Attorney, Agent, or Firm—Berman, Aisenberg & Platt

[57] ABSTRACT

In a liquid heating apparatus of the pulse combustion type, a mounting plate is secured to a side wall of a liquid vessel for supporting thereon an air-fuel mixer head outside the vessel and a combustion chamber inside the vessel, and an inlet pipe is secured at its inner end to a front end wall of the combustion chamber and extended outwardly from the vessel through the mounting plate. The air-fuel mixer head is mounted to an outer end of the inlet pipe at a position spaced from the mounting plate, and the combustion chamber is supported by the inlet pipe at a position spaced from the mounting plate. During pulse combustion, the inlet pipe is cooled by the liquid flowing into the space between the front end wall of the combustion chamber and the mounting plate to protect the mixer head from the heat of high temperature transmitted thereto from the combustion chamber.

4 Claims, 2 Drawing Sheets

LIQUID HEATING APPARATUS OF THE PULSE COMBUSTION TYPE

BACKGROUND OF THE INVENTION

1. Field of the Invention

The present invention relates to a liquid heating apparatus, more particularly to a liquid heating apparatus of the type which includes a pulse combustion burner mounted to a liquid vessel to heat an amount of liquid such as cooking oil or other fluid medium stored therein.

2. Description of the Prior Art

As is disclosed in Japanese Utility Model Early Publication No. 62-125808, a conventional liquid heating apparatus of this type includes a pulse combustion burner the combustion chamber of which is secured at its inlet end to a side wall of an open top liquid vessel and the air-fuel mixer head of which is fixedly mounted to the inlet end of the combustion chamber through the side wall of the vessel to supply a mixture of gaseous fuel and air into the combustion chamber. The pulse combustion burner is provided with a spark plug which is mounted on the side wall of the vessel to ignite the mixture in the combustion chamber. In such an arrangement of the combustion burner, the combustion chamber is directly in contact with the side wall of the vessel without any intervention of liquid. As a result, the side wall of the vessel is extremely heated at a high temperature during pulse combustion of the mixture to cause overheat of the mixer head and the spark plug.

SUMMARY OF THE INVENTION

It is, therefore, a primary object of the present invention to provide an improved liquid heating apparatus wherein the air-fuel mixer head and the spark plug are mounted to the side wall of the vessel in such a manner as to be cooled by the liquid stored in the vessel during pulse combustion of the mixture in the combustion chamber.

According to the present invention, the object is attained by providing a liquid heating apparatus of the pulse combustion type which comprises an open top liquid vessel arranged to store an amount of liquid such as cooking oil or other fluid medium to be heated and a pulse combustion burner assembly mounted on a side wall of the vessel, the burner assembly including an air-fuel mixer head arranged outside the vessel, a combustion chamber arranged inside the vessel to be supplied with a mixture of gaseous fuel and air from the mixer head, and a tailpipe connected at one end thereof to an exhaust port of said combustion chamber in such a manner that the great part of the tailpipe is immersed in the liquid in the vessel and being extended outwardly from the vessel, wherein the burner assembly comprises a mounting plate secured to the side wall of the vessel in a liquid-tight manner for supporting thereon the air-fuel mixer head and the combustion chamber and an inlet pipe having an inner end secured to a front end wall of the combustion chamber and being extended outwardly from the vessel through the mounting plate, and wherein the combustion chamber is supported by the inlet pipe at a position spaced from the mounting plate and the air-fuel mixer head is mounted to an outer end of the inlet pipe at a position spaced from the mounting plate.

In the liquid heating apparatus described above, it is desirable that a spark plug is received by a plug receiver mounted on the mounting plate at a position spaced from the inlet pipe and connected at its inner end to the front end wall of the combustion chamber, and it is also desirable that the tailpipe is extended outwardly from the vessel through the mounting plate.

BRIEF DESCRIPTION OF THE DRAWINGS

Additional objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
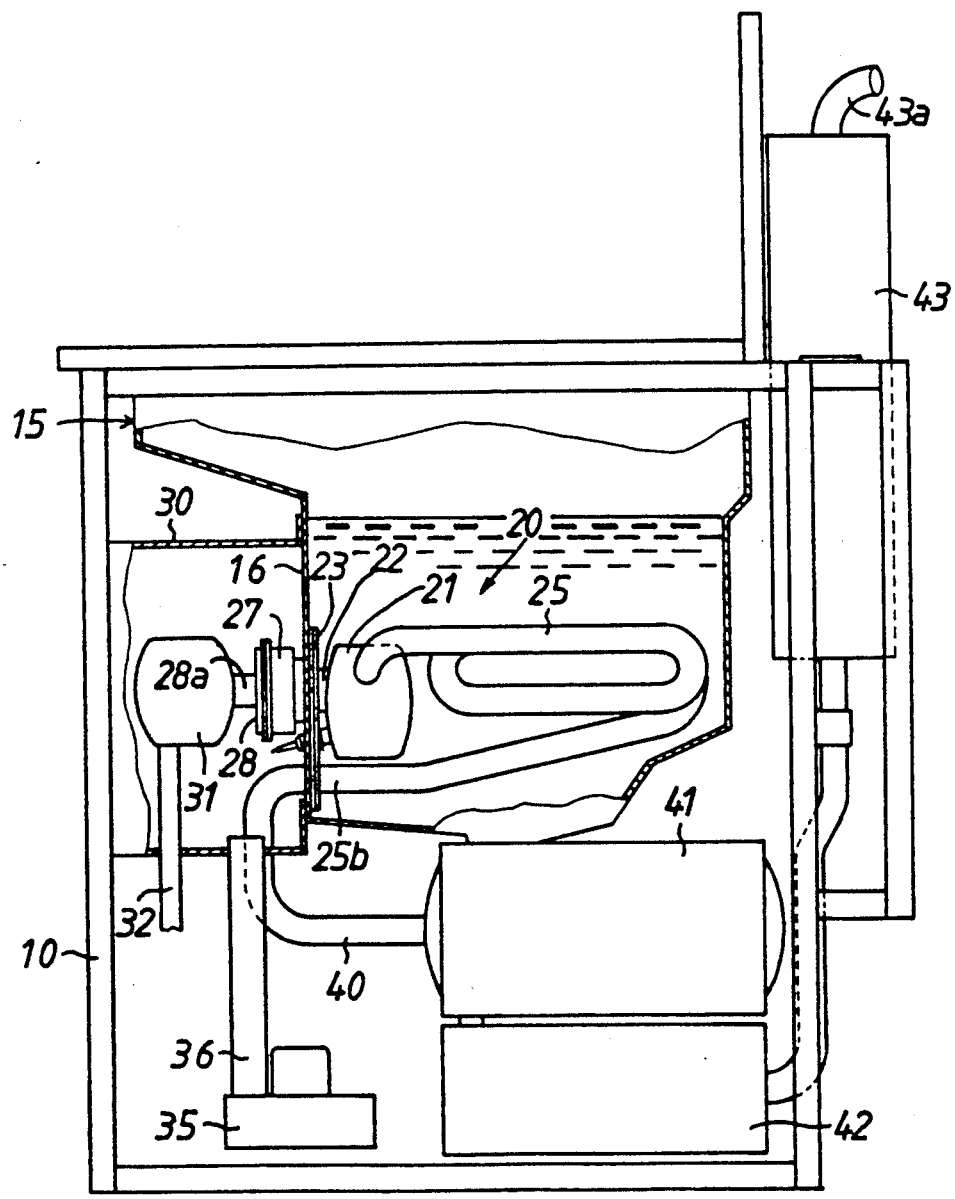
FIG. 1 is a schematic side elevation of a liquid heating apparatus in accordance with the present invention, partially shown in section.
Figure 2:
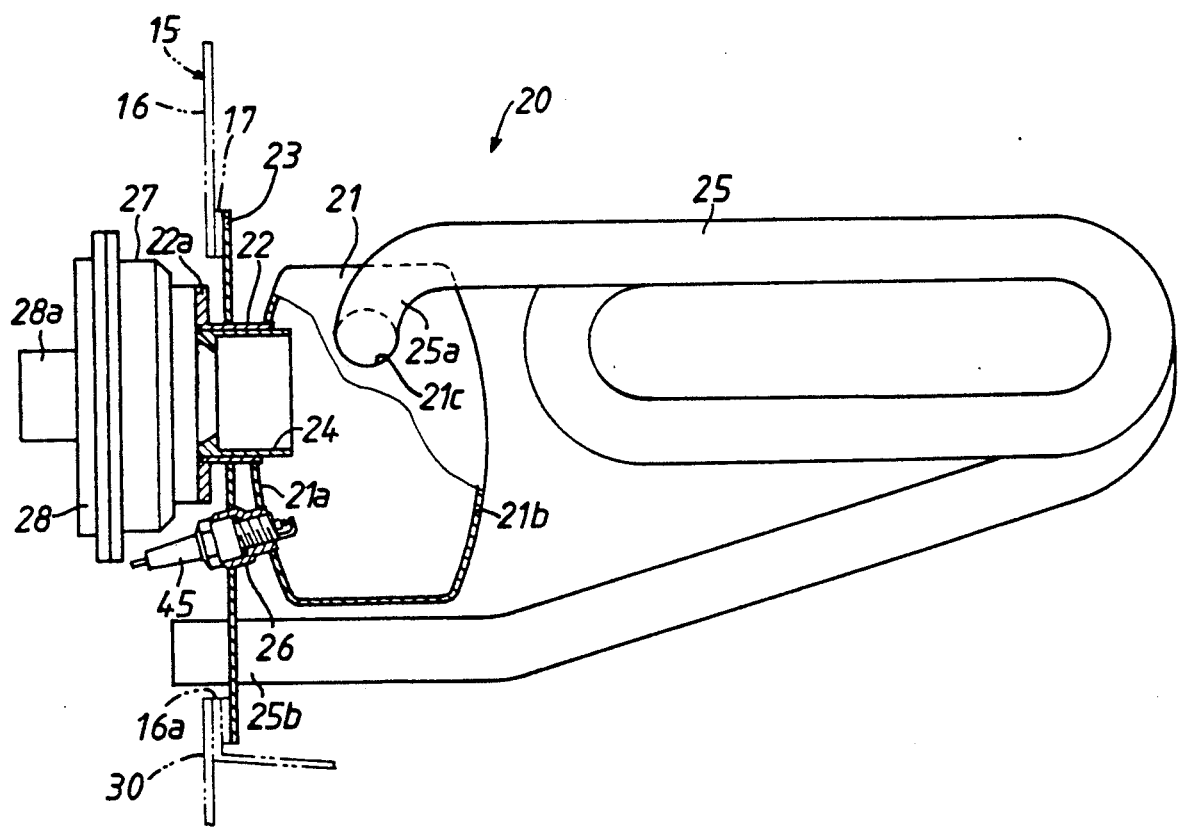
FIG. 2 is an enlarged side elevation of a pulse combustion burner assembly shown in FIG. 1.

In FIG. 1 of the drawings, there is illustrated a liquid heating apparatus in the form of a deep fat fryer which includes an open top liquid vessel 15 of generally rectangular in shape assembled within a support frame 10 to store an amount of cooking oil or other fluid medium to be heated. The liquid vessel 15 has an upright forward side wall 16 which carries a pulse combustion burner assembly 20 mounted thereto. As shown in FIG. 2, the side wall 16 of vessel 15 is formed with an opening 16a for attachment with the combustion burner assembly 20. The burner assembly 20 includes, as main components, a combustion chamber 21, a tailpipe 25 and an air-fuel mixer head 27. A mounting plate 23 of circular in shape is secured at its outer periphery to an internal surface of the side wall 16 by means of a plurality of circumferentially spaced screws (not shown) through an annular gasket 17 to support thereon the combustion chamber 21, tailpipe 25 and mixer head 27 and to close the opening 16a of side wall 16 in a liquid-tight manner.

As shown in FIG. 2, the combustion chamber 21 of burner assembly 20 is in the form of a cylindrical casing which has front and rear end walls 21a, 21b of semi-spherical in shape. The front end wall 21a of combustion chamber 21 carries an inlet pipe 22 welded thereto and extending forwardly therefrom through the mounting plate 23, and the peripheral wall of combustion chamber 21 is formed with an exhaust port 21c in connection to an inner end 25a of tailpipe 25. The inlet pipe 22 is integrally formed at its front end with an annular flange 22a for attachment with the air-fuel mixer head 27. The mounting plate 23 is spaced from the front end wall 21a of combustion chamber 21 in a forward direction and carries the inlet pipe 22 welded thereto in a liquid-tight manner. The tailpipe 25 is extended rearwardly from the combustion chamber 21 and looped at its intermediate portion. An outer end portion 25b of tailpipe 25 is extended forwardly through a lower portion of mounting plate 23 and secured in place by welding to the mounting plate 23. Arranged below the inlet pipe 22 of combustion chamber 21 is a cylindrical plug receiver 26 which is welded at its intermediate portion to the mounting plate 23 and at its inner end to the front wall 21a of combustion chamber 21. A spark plug 45 is threaded into the plug receiver 26 so that an ignition electrode of plug 45 is located in the interior of combustion chamber 21.

The air-fuel mixer head 27 is fixedly mounted to the annular flange 22a of inlet pipe 22 and is in open communication with the interior of combustion chamber 21 through a cylindrical burner head 24 to supply a mixture of gaseous fuel and air thereinto. The burner head 24 is coupled within the inlet pipe 22 and positioned in place by engagement with an inner end of mixer head 27. The air-fuel mixer head 27 has an air-fuel intake assembly 28 which is provided at its center with a gas intake port 28a and at its periphery with an air intake port (not shown). The gas intake port 28a is provided therein with a non-return valve and a deflector (not shown) for permitting only the inward flow of gaseous fuel supplied therethrough into the mixer head 27 and for blocking the reverse flow of the mixture. Similarly, the air intake port is provided therein with a non-return valve and a deflector (not shown) for permitting only the inward flow of fresh air supplied therethrough into the mixer head 27 and for blocking the reverse flow of the mixture. As shown in FIG. 1, the gas intake port 28a is connected to a gas container 31 which is connected to a source of gaseous fuel (not shown) by means of a gas supply conduit 32. The gas supply conduit 32 is provided with an electromagnetic valve (not shown) for control of the flow of gaseous fuel supplied therethrough into the gas container 31 and is connected to the source of gaseous fuel through an intake muffler (not shown).

The mixer head 27 and gas container 31 are housed in an air chamber casing 30 which is mounted to the side wall 16 of vessel 15 in an air-tight manner. The air chamber casing 31 is connected to an electrically operated air blower 35 through an upstanding air supply pipe 36 to be supplied with fresh air therefrom. The outer end portion 25b of tailpipe 25 is connected to an exhaust muffler assembly through an extension pipe 40. The exhaust muffler assembly includes a decoupler 41 horizontally arranged just below a rear bottom portion of vessel 15 and connected at its inlet to the extension pipe 40, a first muffler 42 located in parallel with the decoupler 41 and connected in series at its inlet to the decoupler 41, and a second upright muffler 43 located behind the vessel 15 and being detachably connected in series at its inlet to an upstanding pipe in connection to the first muffler 42. The upright muffler 43 has an exhaust pipe 43a arranged to permit the combustion products exhausted therefrom outwardly.

Assuming that the mixer head 27 has been supplied with gaseous fuel and fresh air from the gas container 31 and air chamber casing 30 to supply a mixture of the gaseous fuel and air into the combustion chamber 21 therefrom, the mixture is ignited by energization of the spark plug 45 in the combustion chamber 21. When explosive combustion of the mixture takes place at a high temperature in the combustion chamber 21, the non-return valves in the air-fuel intake assembly 28 are closed by a momentary positive pressure in the combustion chamber 21 to block the reverse flow of combustion products, while the combustion products are exhausted through the tailpipe 25, extension pipe 40 and the exhaust muffler assembly. Ignition and combustion are followed by a contraction which produces a momentary negative pressure in the tailpipe 25 for drawing in a fresh supply of gaseous fuel and air through the non-return valves in the air-fuel intake assembly 28. During the momentary negative pressure, the flow of combustion products at the exhaust end of tailpipe 25 is reversed. The fresh charge which has been drawn in during the momentary negative pressure automatically ignites without the need for energization of the spark plug 45, and the explosive combustion repeats itself. Thus, a resonance is established in the tailpipe 25 at a high frequency, and the pulse combustion burner 20 operates as a self-powered burner.

During the activation of the pulse combustion burner 20, the combustion chamber 21 and tailpipe 25 are extremely heated by the combustion products of high temperature, and the liquid in vessel 15 is efficiently heated by thermal exchange with the combustion products passing through the tailpipe 25. In such a condition, the inlet pipe 22 and plug receiver 26 are cooled by the liquid flowing into the space between the front end wall 21a of combustion chamber 21 and the mounting plate 23. This is effective to protect the mixer head 27 and spark plug 45 from the heat of high temperature transmitted thereto from the combustion chamber 21. In the liquid heating apparatus, the combustion chamber 21 and tailpipe 25 each are secured to the same side wall 16 of vessel 15 and spaced to one another in a small distance. Thus, a difference in thermal strain between the tailpipe 25 and the side wall 16 of vessel 15 is restrained in a small value and absorbed by resilient deformation of the tailpipe 25 to reduce thermal stress at the welded portion of tailpipe 25. This is useful to eliminate the occurrence of cracks in the welded portion of tailpipe 25 to the side wall 16 of vessel 15.

Although the preferred embodiment of the present invention has been shown and described, it should be understood that various modifications and rearrangements of the parts may be resorted to without departing from the scope of the invention as disclosed and claimed herein.

What is claimed is:

1. A liquid heating apparatus of the pulse combustion type comprising a liquid vessel arranged to store an amount of liquid such as cooking oil or other fluid medium to be heated and a pulse combustion burner assembly mounted to a side wall of said vessel, said burner assembly including an air-fuel mixer head arranged outside said vessel, a combustion chamber arranged inside said vessel to be supplied with a mixture of gaseous fuel and air from said mixer head, an exhaust port in a wall of said combustion chamber, and a tailpipe connected at one end thereof to said exhaust port of said combustion chamber in such a manner that a greater part of said tailpipe is immersed in the liquid in said vessel, the other end thereof being extended outwardly from said vessel, wherein said burner assembly comprises a mounting plate secured to the side wall of said vessel in a liquid-tight manner for supporting thereon said air-fuel mixer head and said combustion chamber and an inlet pipe having an inner end secured to a front end wall of said combustion chamber and being extended outwardly from said vessel through said mounting plate, and wherein said combustion chamber is supported by said inlet pipe at a position spaced from said mounting plate and said air-fuel mixer head is mounted to an outer end of said inlet pipe at a position spaced from said mounting plate.

2. A liquid heating apparatus as claimed in claim 1, wherein a spark plug is supported by a plug receiver mounted on said mounting plate at a position spaced from said inlet pipe and connected at its inner end to the front end wall of said combustion chamber.

3. A liquid heating apparatus as claimed in claim 1, further comprising a cylindrical burner head coupled within said inlet pipe and positioned in place by engagement with an inner end of said air-fuel mixer head to supply the mixture of gaseous fuel and air into said combustion chamber therethrough.

4. A liquid heating apparatus as claimed in claim 1, wherein said tailpipe is extended outwardly from said vessel through said mounting plate.

* * * * *